United States Patent
Kano et al.

(10) Patent No.: US 7,016,559 B2
(45) Date of Patent: Mar. 21, 2006

(54) OPTICAL TRANSMITTER-RECEIVER AND OPTICAL FIBER

(75) Inventors: Mariko Kano, Kanagawa (JP); Yoichi Toriumi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/868,477

(22) Filed: Jun. 15, 2004

(65) Prior Publication Data
US 2005/0025437 A1 Feb. 3, 2005

(30) Foreign Application Priority Data
Jun. 17, 2003 (JP) .............................. 2003-172480

(51) Int. Cl.
*G02B 6/12* (2006.01)
*H04B 10/00* (2006.01)

(52) U.S. Cl. .............................. 385/14; 385/31; 385/33; 385/92; 385/93; 398/140; 398/141

(58) Field of Classification Search ................. 385/14, 385/88, 89, 92, 93, 31, 33, 49; 398/140, 398/141, 142
See application file for complete search history.

(56) References Cited

U.S. PATENT DOCUMENTS

| | | | | |
|---|---|---|---|---|
| 4,978,190 | A * | 12/1990 | Veith ............................ | 385/33 |
| 2003/0215234 | A1 * | 11/2003 | Mine et al. .................... | 398/41 |
| 2005/0025437 | A1 * | 2/2005 | Kano et al. .................... | 385/89 |
| 2005/0053338 | A1 * | 3/2005 | Chou et al. .................... | 385/93 |
| 2005/0213983 | A1 * | 9/2005 | Shie et al. .................. | 398/135 |

* cited by examiner

Primary Examiner—Brian M. Healy
(74) Attorney, Agent, or Firm—Frommer Lawrence & Haug LLP; William S. Frommer

(57) ABSTRACT

Light emitted from a light-emitting element is reflected by a beam splitter and made incident upon an optical fiber, while light launched from the optical fiber passes through the beam splitter and is made incident upon a light-receiving element. A lens is provided to focus the light emitted from the light-emitting element to an end face of the optical fiber and also the light launched, as diffused, from the optical fiber. Further, an optical plate is provided to form a reflecting surface on the upstream side of the end face of the optical fiber.

14 Claims, 10 Drawing Sheets

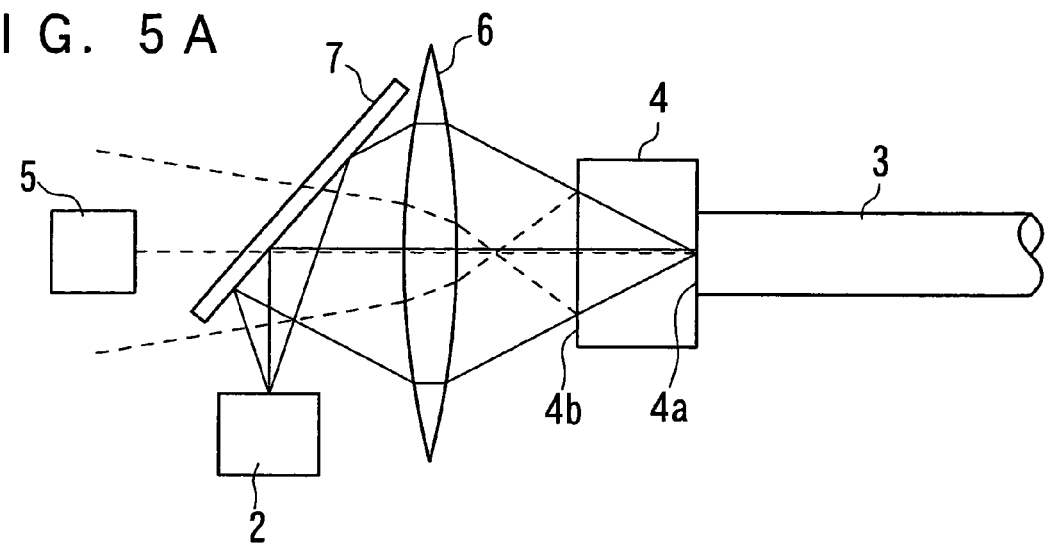
F I G. 5 A
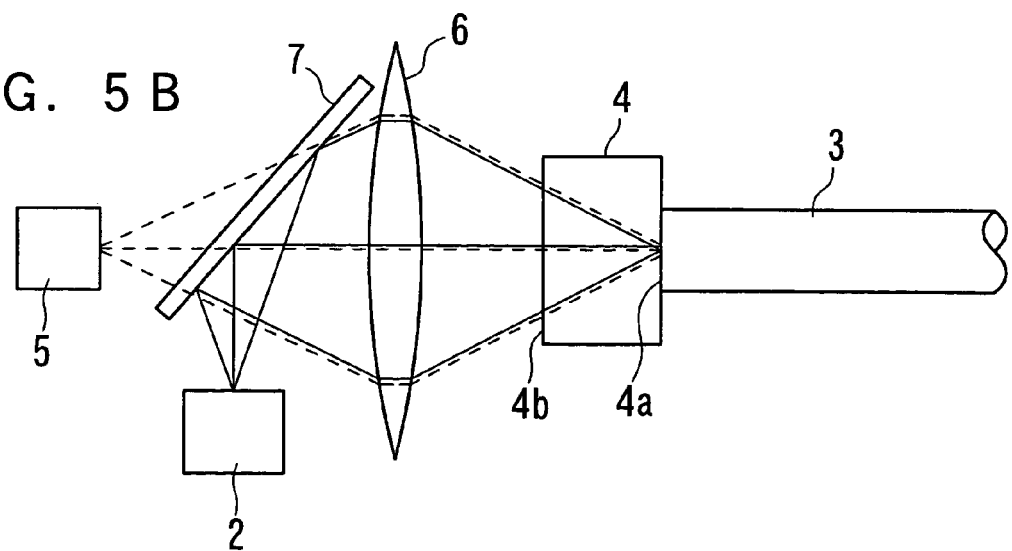
F I G. 5 B

FIG. 7
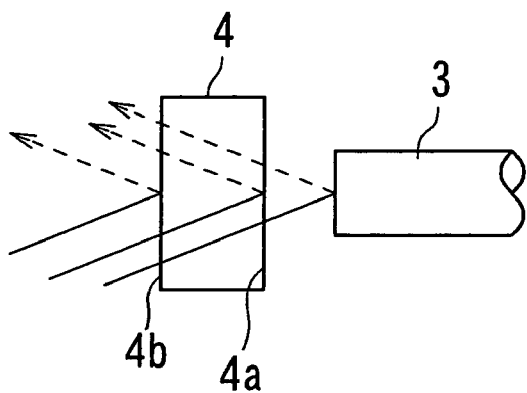
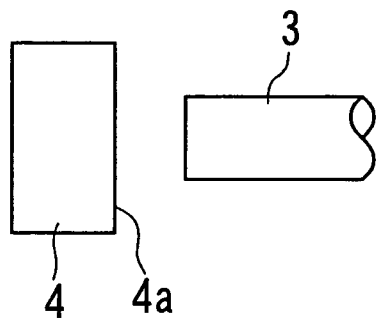
FIG. 8A
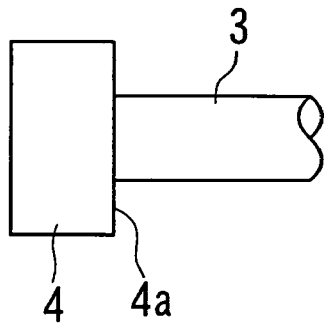
FIG. 8B

OPTICAL TRANSMITTER-RECEIVER AND OPTICAL FIBER

BACKGROUND OF THE INVENTION

1. Field of the Invention

The present invention relates to an optical transmitter-receiver and an optical fiber. More specifically, it relates an optical transmitter-receiver that is connected with single-core optical fiber, and the like.

2. Description of Related Art

FIG. 1 is an explanatory diagram of an outlined configuration of an optical communication system 100 for performing bi-directional communication using single-core optical fiber. This optical communication system 100 comprises two optical transmitter-receivers 103A, 103B each including a light-emitting element 101 and a light-receiving element 102, and a single-core optical fiber 104 for connecting the optical transmitter-receivers 103A, 103B. When the optical transmitter-receiver 103A transmits data to the optical transmitter-receiver 103B, the light-emitting element 101 in the optical transmitter-receiver 103A emits light. The light emitted from the light-emitting element 101 in the optical transmitter-receiver 103A is transferred through the optical fiber 104. The light-receiving element 102 in the optical transmitter-receiver 103B then receives it.

When the optical transmitter-receiver 103B transmits data to the optical transmitter-receiver 103A, the light-emitting element 101 in the optical transmitter-receiver 103B emits light. The light emitted from the light-emitting element 101 in the optical transmitter-receiver 103B is transferred through the optical fiber 104 used to transmit data from the optical transmitter-receiver 103A. The light-receiving element 102 in the optical transmitter-receiver 103A then receives it.

Such a technology for simultaneously performing transmission and reception between the optical transmitter-receiver 103A and the optical transmitter-receiver 103B using the single-core optical fiber 104 is referred to as "single-core bi-directional full-duplex optical fiber communication", for example.

To perform the single-core bi-directional full-duplex optical fiber communication, it is required to provide an optical transmitter-receiver having a function for guiding the light emitted from the light-emitting element 101 to the optical fiber 104 and the light launched from this optical fiber 104 to the light-receiving element 102. As the optical transmitter-receiver having such the function, the optical transmitter-receiver having such a configuration as to use a beam splitter is known.

FIG. 2 is a plan view for showing an outlined configuration of a conventional optical transmitter-receiver 103 equipped with such the beam splitter. The optical transmitter-receiver 103 emits light from the light-emitting element 101 and splits it using a beam splitter 107 having a transmission coefficient of about 50% and a reflection coefficient of about 50%. The optical transmitter-receiver 103 then focuses the emitted light on an end face of the optical fiber 104 using a lens 108. The optical transmitter-receiver 103, on the other hand, focuses light reflected by the optical fiber 104 through the lens 108 used in the transmission and passes it through the beam splitter 107. The light-receiving element 102 then receives it. In FIG. 2, the light thus emitted is indicated by a solid line and the light thus received, by a broken line.

In the optical transmitter-receiver 103 using the beam splitter 107, the light thus emitted and received uses the same optical axis, so that the lens 108 can be arranged in the vicinity of the end face of the optical fiber 104 to focus the light emitted and received. This results in an increase in both of an efficiency of incident light from the light-emitting element 101 to the optical fiber 104 and an efficiency of receiving of it from the optical fiber 104 to the light-receiving element 102.

In the optical transmitter-receiver using the beam splitter 107, however, the light emitted from the light-emitting element 101 and reflected by the end face of the optical fiber 104 is focused through the lens 108 on the light-receiving element 102 and coupled to the light-receiving element 102. Thus, the optical transmitter-receiver has such a disadvantage that large crosstalk peculiar to single-core bi-directional optical fiber communication occurs.

FIG. 3 is an explanatory diagram of principles of crosstalk occurring. In FIG. 3, a letter, "S" indicates signal light from an optical transmitter-receiver, not shown in the figure. Alternatively, the beam splitter 107 reflects other signal light emitted from the light-emitting element 101. The lens 108 then focuses and enters it into the optical fiber 104 through its end face. The end face of the optical fiber 104, however, reflects a part of the light emitted from this light-emitting element 101. The part is then focused through the lens 108 on the light-receiving element 102 and coupled to the light-receiving element 102 because the signal light S and said other signal light use the same optical axis in propagation. This provides crosstalk N.

The following will describe an example for obtaining following Equation (1) for calculating an S/N (the signal light S and the crosstalk N) ratio of a conventional optical transmitter-receiver using a beam splitter.

$$S=0.5aP_2=0.5P_2 \text{ and}$$

$$N=0.5\times0.5bcP_1=5.0\times10^{-3}P_1$$

$$S/N=100P_2/P_1 \quad (1)$$

wherein the calculation is performed on the basis of the following assumption:

$P_1$: intensity of light emitted from light-emitting element;

$P_2$: intensity of light emitted from fiber;

a: coupling efficiency of signal light with light-receiving element;

b: reflection coefficient of light being reflected by end face of fiber; and c: coupling efficient of light returned from end face of fiber with light-receiving element.

It is to be noted that in the calculation, a transmission coefficient of the beam splitter is supposed to be 0.5 and a reflection coefficient of it, 0.5.

If a signal light is coupled to the light-receiving element totally, a=1 is given. If the optical fiber is made of fluorine-based plastic fiber having a refraction index of about 1.35, b=0.02 is given. If the light returned from the end face of the fiber is totally coupled to the light-receiving element, c=1 is given.

In single-core bi-directional communication in a gigahertz frequency band, to achieve a bit error rate $BER<10^{-12}$, generally S/N>10 is necessary, so that a tolerable loss is given by the following equation (2):

$$P_1/P_2>0.1 \quad (2)$$

According to Equation (2), only a loss of −10 dB is allowed a range from the light-emitting element to a light-launched end of the fiber. A loss of −3 dB is suffered through the beam splitter until light reaches an incident end of the fiber, so that the remaining loss of −7 dB is tolerable.

Assuming, for example, a case of laying down fluorine-based plastic fiber having a transmission loss of −4 dB/100 m, a flexure loss of 0.2 dB/90°, and a tolerable curvature radius R=20 mm, the fiber can be flexed only 15 times over a distance of 100 m. This inflicts a heavy restriction on laying down of the fiber, so that the requirement of S/N>10 cannot be met in such a laying-down environment that the fiber is always flexed 16 time or more, for example, thus proving a difficulty in single-core bi-directional communication in a giga-hertz frequency band.

SUMMARY OF THE INVENTION

To solve these problems the present invention has been developed, and it is an object of the present invention to provide an optical transmitter-receiver and an optical fiber that can suppress crosstalk.

The object of the invention is to improve an optical transmitter-receiver connected to a single-core optical fiber according to the invention. The optical transmitter-receiver comprises light emitter for emitting first light, light receiver for receiving second light launched from the optical fiber, and focusing device for focusing the first light to the optical fiber and the second light to the light receiver. The optical transmitter-receiver also comprises optical-path splitter for splitting the first light emitted from the light emitter to guide it to the optical fiber and to guide the second light launched from the optical fiber to the light receiver. The optical transmitter-receiver further comprises reflector for reflecting a part of the first light, which is returned to the light receiver. The reflector has a fiber-contacting face for allowing it to come in contact with an end face of the optical fiber and a face for reflecting the part of the first light, which is opposite to the fiber-contacting face.

According to the optical transmitter-receiver related to the present invention, the first light is emitted from the light emitter in transmission. The first light emitted from the light emitter is split and guided by the optical-path splitter to the optical fiber and focused through the focusing device so as to enter the optical fiber through its end face. In reception, the second light is launched from the optical fiber. The second light launched from the optical fiber is focused through the focusing device and guided to the light receiver by the optical-path splitter.

It is to be noted that a part of the first light emitted from the light emitter is reflected by the face of the reflector, which is positioned on the upstream side of the end face of the optical fiber. The light thus returned that is reflected by this face of the reflector is not focused to the light receiver, so that crosstalk is suppressed.

For example, if the reflector is made of a material having a refraction index nearly equal to that of the optical fiber, a reflection coefficient of a boundary face between the fiber-contacting face of the reflector and the end face of the optical fiber is reduced. Therefore, crosstalk is suppressed.

As described above, only by adding such the reflector, the crosstalk is reduced, thereby providing an inexpensive optical transmitter-receiver for performing single-core bi-directional full-duplex optical fiber communication.

In accordance with another aspect of the invention, an optical fiber connected to an optical transmitter-receiver for performing transmission and reception of an optical signal. The optical fiber comprises a main optical fiber and a reflector for reflecting return light. The reflector has a fiber-contacting face for allowing it to come in contact with the main optical fiber and a face for reflecting the return light, which is opposite to the fiber-contacting face. The reflector is attached to an end face of the main optical fiber to which light from the optical transmitter-receiver is focused with the fiber-contacting face thereof being brought in contact with the end face of the main optical fiber.

According to the optical fiber related to the present invention, light emitted from the optical transmitter-receiver is focused on the end face of the main optical fiber. A part of this light thus emitted is reflected by the face for reflecting the return light in the reflector, which is positioned on the upstream side of the end face of the main optical fiber. The light thus returned by reflection of this face is not focused on the light-receiver of the optical transmitter-receiver. Therefore, according to the optical fiber related to the present invention, crosstalk is reduced, thereby providing an optical communication system that can realize good single-core bi-directional full-duplex optical fiber communication.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 5A and 5B are explanatory diagrams each for showing an example of an optical path for return light in the first embodiment of the optical transmitter-receiver;

FIG. 7 is an explanatory diagram for showing an example of an optical path for return light in a case where an optical plate and the optical fiber are separated from each other;

FIGS. 8A and 8B are explanatory diagrams each for showing a first configuration of splicing the optical plate and the optical fiber to each other;

DESCRIPTION OF THE PREFERRED EMBODIMENTS

Figure 4:
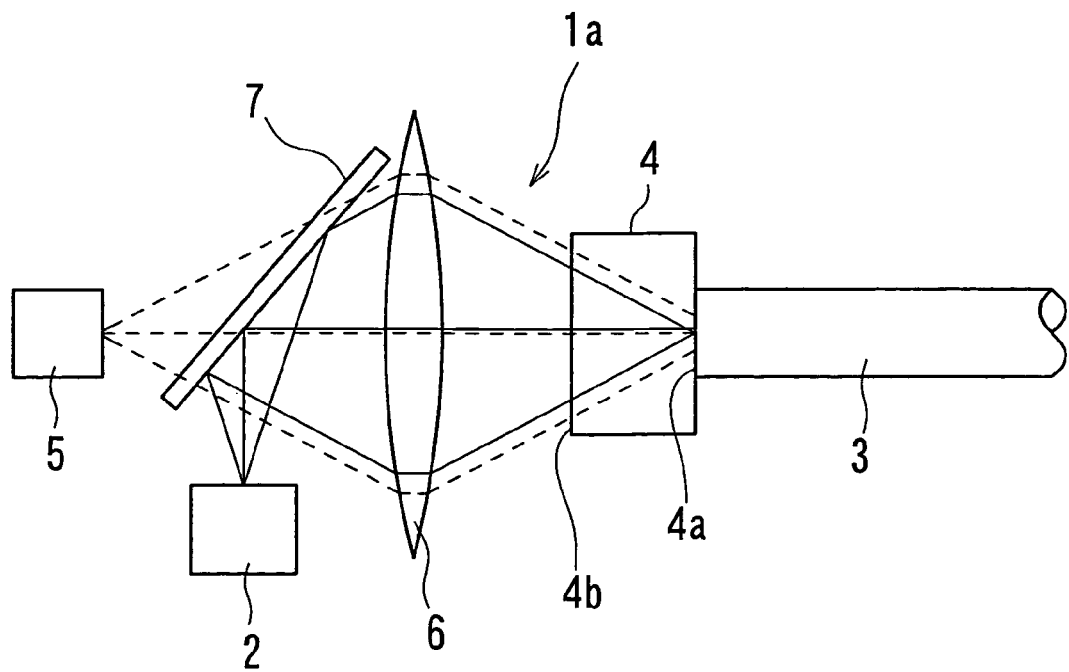
FIG. 4 is a plan view for showing an outlined configuration of a first embodiment of an optical transmitter-receiver according to the invention.

The following will describe embodiments of the present invention with reference to drawings. FIG. 4 is a plan view for showing an outlined configuration of a first embodiment of an optical transmitter-receiver according to the invention. In the first embodiment of the optical transmitter-receiver 1a, an optical plate 4 is mounted to an end face of an optical fiber 3 upon which light emitted from a light-emitting element 2 is made incident. This allows the light returned to a light-receiving element 5, which is reflected by the end face of the optical fiber 3, to be reduced.

The light-emitting element 2 serving as light-emitter is constituted of, for example, a laser diode. The light-receiving element 5 serving as light receiver is constituted of, for example, a photodiode. A lens 6 is one example of light focusing device, thus focusing the light emitted from the light-emitting element 2 on the end face of the optical fiber 3 and also focusing light launched, as diffused, from the optical fiber 3 on the light-receiving element 5 for coupling with it. It is to be noted that the light-emitting element 2 and the light-receiving element 5 may be replaced with each other in layout.

A beam splitter 7 is a half-mirror having a transmission coefficient of about 50% and a reflection coefficient of about 50% and arranged on an optical axis of the lens 6, to constitute optical-path splitter for reflecting the light emitted from the light-emitting element 2 to guide it to the optical fiber 3 and also transmitting the light launched from the optical fiber 3 to guide it to the light-receiving element 5.

The optical plate 4 is one example of the reflector for reflecting a part of the light emitted from the light-emitting element 2, which is returned to the light-receiving element 5. The optical plate 4 is equipped with a fiber-contacting face 4a on its one surface and a face 4b for reflecting the part of the light emitted from the light-emitting element 2, which is opposite to the fiber-contacting face 4a. The optical plate 4 is such a transparent block that the fiber-contacting face 4a and the face 4b are, for example, circular column-shaped or rectangular column-shaped. This optical plate 4 is made of a transparent material having a refraction index nearly equal to that of the optical fiber 3.

The optical plate 4 is arranged on the optical axis of the lens 6 in such a manner that the face 4b may face the lens 6 with a predetermined distance therebetween. Further, the fiber-contacting face 4a comes in contact with the end face of the optical fiber 3 closely.

It is configured that the light emitted from the light-emitting element 2 may be focused through the lens 6 on the end face of the optical fiber 3, so that a spot, which is made incident upon the face 4b positioned closer to the lens 6 than the end face of the optical fiber 3 by as much as the predetermined distance, has a large diameter. Therefore, a size of the optical plate 4 is set so that an area of the face 4b may be larger than the spot diameter at the position of the face 4b.

The following will describe operations of the first embodiment of the optical transmitter-receiver 1a. Note here that in FIG. 4, the light emitted from the light-emitting element 2 is indicated by a solid line and the light receive by the light-receiving element 5, by a broken line. In the case of transmission from the optical transmitter-receiver 1a, the light is emitted from the light-emitting element 2. The light emitted from the light-emitting element 2 is reflected by the beam splitter 7 and guided into the lens 6.

The light focused through the lens 6 passes through the optical plate 4 and enters the optical fiber 3 through the end face thereof. Accordingly, the light emitted from the light-emitting element 2 in the optical transmitter-receiver 1a connected to one end of the optical fiber 3 propagates through the optical fiber 3, thus being transmitted to an optical transmitter-receiver, not shown, which has the same configuration and is connected to the other end of the optical fiber 3.

In the case of reception by the optical transmitter-receiver 1a, the light launched, as diffused, from the optical fiber 3 is focused through the lens 6 and passes through the beam splitter 7 and is coupled to the light-receiving element 5.

FIGS. 5A and 5B are explanatory diagrams each for showing an example of an optical path for light returned to the light-receiving element 5 in the first embodiment of the optical transmitter-receiver. In FIGS. 5A and 5B, the light emitted from the light-emitting element 2 is indicated by a solid line and the light receive by the light-receiving element 5, by a broken line.

The light emitted from the light-emitting element 2 is reflected by the beam splitter 7 and focused through the lens 6 to enter the optical fiber 3. A part of the light emitted from the light-emitting element 2 is then reflected by the face 4b of the optical plate 4, to provide the light returned to the light-receiving element 5, as shown in FIG. 5A.

It is to be noted that the light emitted from the light-emitting element 2 is focused through the lens 6 on the end face of the optical fiber 3, so that the light thus returned, which is reflected by the face 4b positioned closer to the lens 6 than the end face of the optical fiber 3 by as much as the predetermined distance, is not focused at the position of the light-receiving element 5 even after passing through the lens 6. Accordingly, crosstalk can be reduced.

For example, the light $N_P$ returned by the face 4b in a case where the optical plate 4 is made of quartz is given by following Equation (3).

$$N_P = 0.5 \times 0.5 de P_1 = 3.8 \times 10^{-4} P_1 \quad (3)$$

wherein the calculation is performed on the basis of the following assumption:

$P_1$: Intensity of light emitted from the light-emitting element 2;

d: reflection coefficient of the face 4b of the optical plate 4; and e: coupling efficiency between the light returned at the face 4b of the optical plate 4 and the light-receiving element 5.

It is to be noted that in the calculation, the transmission factor of the beam splitter 7 is supposed to be 0.5 and its reflecting coefficient, to be 0.5. Further, d=0.03 in a case where the optical plate 4 is made of quartz glass having a refraction index of about 1.45. Also, it is supposed that provision of the optical plate 4 has resulted in a spot diameter of 700 μm of the return light at a light receiving position of the light-receiving element 5. In a case where a diameter of received light at the light-receiving element 5 is 120 μm, e=0.05.

A part of the light emitted from the light-emitting element 2 and focused through the lens 6 to enter the optical fiber 3 is reflected by the end face of the optical fiber 3, to provide light returned to the light-receiving element 5, as shown in FIG. 5B. However, by making the optical plate 4 of a material having a refraction index nearly equal to that of the optical fiber 3, a reflection coefficient is reduced at a boundary face between the fiber-contacting face 4a of the optical plate 4 and the end face of the optical fiber 3.

Accordingly, the light reflected by the end face of the optical fiber 3 and returned to the light-receiving element 5, that is, crosstalk can be reduced. Such the light Nr returned at the end face of the optical fiber 3 in a case where the optical fiber 3 is made of, for example, fluorine-based plastic fiber is given by following Equation (4).

$$N_f = 0.5 \times 0.5(1-d)^2 fgP_1 = 2.4 \times 10^{-4} P_1 \quad (4)$$

wherein:

$P_1$: Intensity of light emitted from the light-emitting element 2;

f: Reflection coefficient at a boundary face between the fiber-contacting face of the optical plate 4 and the end face of the optical fiber 3; and g: coupling efficient between the light returned at the end face of the optical fiber 3 and the light-receiving element 5.

In a case where the optical plate 4 is made of quartz glass having a refractive index of about 1.45 and the optical fiber 3 is made of fluorine-based plastic fiber having a refraction index of about 1.35, f=0.001, and in a case where the light returned at the end face of the optical fiber 3 is coupled totally to the light-receiving element 5, g=1.

Signal light S is given by following Equation (5).

$$S = 0.5a(1-d)P_2 = 0.49P_2 \quad (5)$$

Wherein:

P2: Intensity of light launched from the fiber;

a: coupling intensity of signal light with the light-receiving element; and d: reflection coefficient of the face 4b of the optical plate 4.

In a case where the signal light is coupled totally to the light-receiving element 5, a=1.

Accordingly, an S/N ratio is given by following Equation (6) taking into account the light $N_P$ returned at the face 4b of the optical plate 4 and the light Nr returned at the end face of the optical fiber 3.

$$S/N = S/(N_P + N_f) = 790 P_2/P_1 \quad (6)$$

To achieve a bit error rate of BER<$10^{-12}$ in single-core bi-directional communication in a giga-hertz frequency band, generally a relationship of S/N>10 is required, so that a tolerable loss is given by following Equation (7).

$$P_1/P_2 > 0.013 \quad (7)$$

According to Equation (7), a loss of −19 dB is tolerated. Accordingly, it is appreciated that the tolerable loss through the optical fiber 3 according to this embodiment is increased by as much as 9 dB as compared with that of the conventional optical transmitter-receiver not equipped with the optical plate 4 obtained by Equation (2).

Figure 6A:
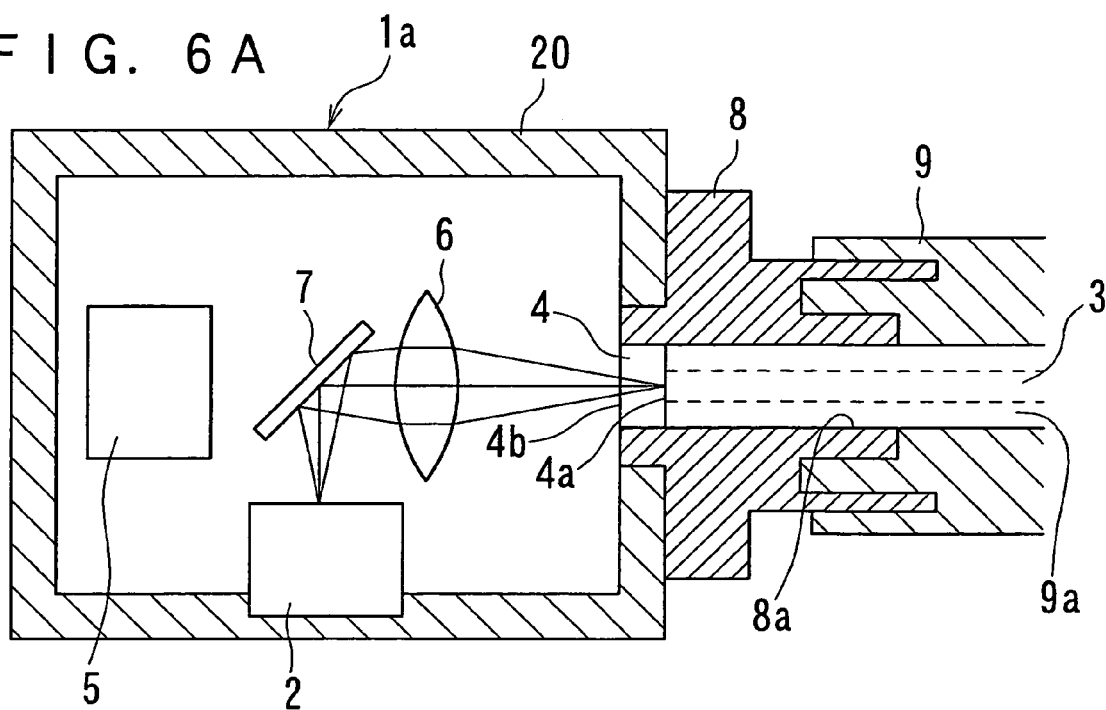
FIGS. 6A and 6B are plan views each for showing a configuration of the optical transmitter-receiver to which an optical fiber can be attached/detached.
Figure 6B:
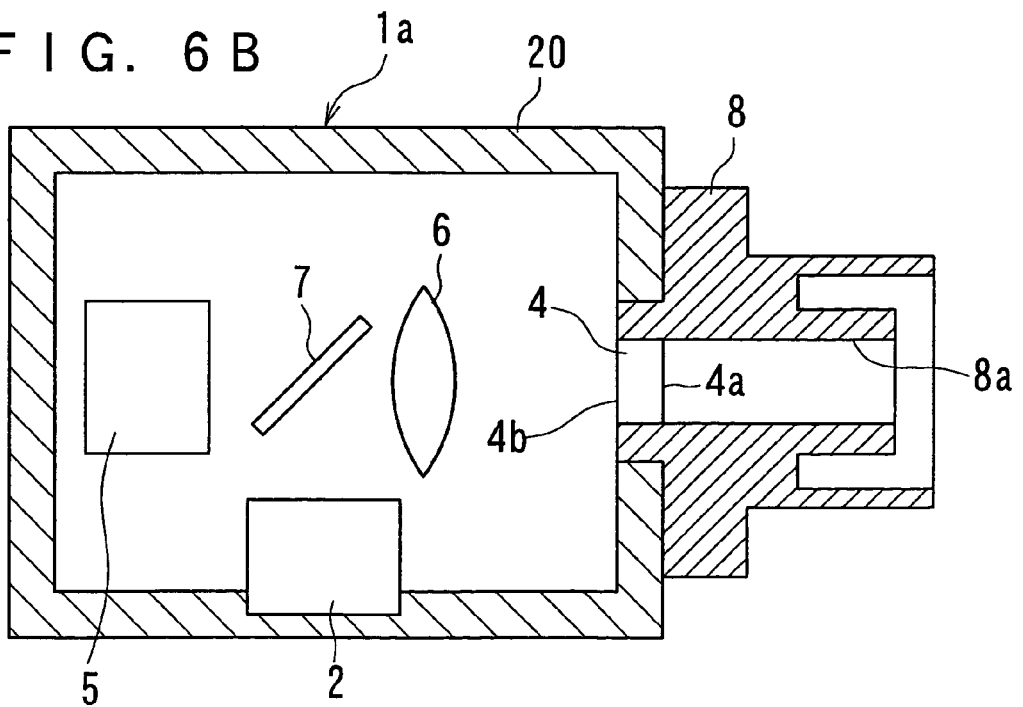

The first embodiment of the above-mentioned optical transmitter-receiver 1a may be of such a configuration that the optical fiber 3 is detachable or that it is fixed un- detachably. The following will describe one example of the configuration that the optical fiber 3 is detachable. FIGS. 6A and 6B are plan views each for showing a configuration of the optical transmitter-receiver 1a to which the optical fiber 3 is detachable. FIG. 6A shows a condition where the optical fiber 3 is attached and FIG. 6B shows a condition where the optical fiber is detached.

The optical transmitter-receiver 1a comprises a package 20. The optical transmitter-receiver 1a also comprises a light-emitting element 2, a light-receiving element 5, an optical plate 4, a lens 6, and a beam splitter 7, which are enclosed in the package 20. Further, the optical transmitter-receiver 1a comprises a connector 8 as one example of an attachment. The optical fiber 3 is equipped with a plug 9 for connecting it to the connector 8 so that the optical fiber 3 can be attached to and detached from the optical transmitter-receiver 1a in configuration.

The plug 9 is provided with a ferrule 9a. To the tip of this ferrule 9a, the end face of the optical fiber 3 is exposed. The connector 8 is provided with a sleeve 8a into which the ferrule 9a of the plug 9 is inserted. The sleeve 8a is one example of guide member. When the plug 9 is connected to the connector 8, the ferrule 9a is inserted into the sleeve 8a, so that the optical fiber 3 and the lens 6 are aligned with each other in such a manner that their optical axes may agree.

The optical plate 4 is mounted, for example, inside the sleeve 8a of the connector 8 as shown in FIG. 6B. Then, when the pug 9 is connected to the connector 8, as shown in FIG. 6A, the end face of the optical fiber 3 that is supported by the sleeve 8a is guided to press and come in contact with the fiber-contacting face 4a of the optical plate 4. Thus, they may be brought in contact with each other closely.

It is configured that when the plug 9 is connected to the connector 8, the light emitted from the light-emitting element 2, which is indicated by a solid line in FIG. 6A, may be focused through the lens 6 on the end face of the optical fiber 3. Therefore, since a face 4b that is opposite to the fiber-contacting face 4a is present on the upstream side of the end face of the optical fiber 3, a part of light, which is reflected by the face 4b of the optical plate 4, becomes light returned to the light-receiving element 5. This, however, prevents the light thus returned from focusing on the light-receiving element 5, so that crosstalk can be reduced.

The following will explain why the fiber-contacting face 4a of the optical plate 4 and the end face of the optical fiber 3 are to be closely brought in contact with each other. FIG. 7 is an explanatory diagram for showing an example of an optical path for light returned to the light-receiving element in a case where the optical plate 4 and the optical fiber 3 are separated from each other. In FIG. 7, the light emitted from the light-emitting element is indicated by a solid line and the light receive by the light-receiving element, by a broken line.

If an airspace exists between the fiber-contacting face 4a of the optical plate 4 and the end face of the optical fiber 3, a part of the light emitted from the light-emitting element 2 shown in FIG. 4 is reflected by the fiber-contacting face 4a of the optical plate 4, to provide light return to the light-receiving element 5. Further, another part of the light from the light-emitting element 2 is also reflected by the end face of the optical fiber 3 to provide light returned to the light-receiving element 5. Thus, when there is a gap between the fiber-contacting face 4a of the optical plate 4 and the end face of the optical fiber 3, returned light increases in amount, thus providing large crosstalk.

To solve this problem, such a configuration is provided that the fiber-contacting face 4a of the optical plate 4 and the end face of the optical fiber 3 may be closely brought in contact with each other. The following will describe such a configuration that the fiber-contacting face 4a of the optical plate 4 and the end face of the optical fiber 3 are closely brought in contact so as to be spliced to each other.

Figure 1:
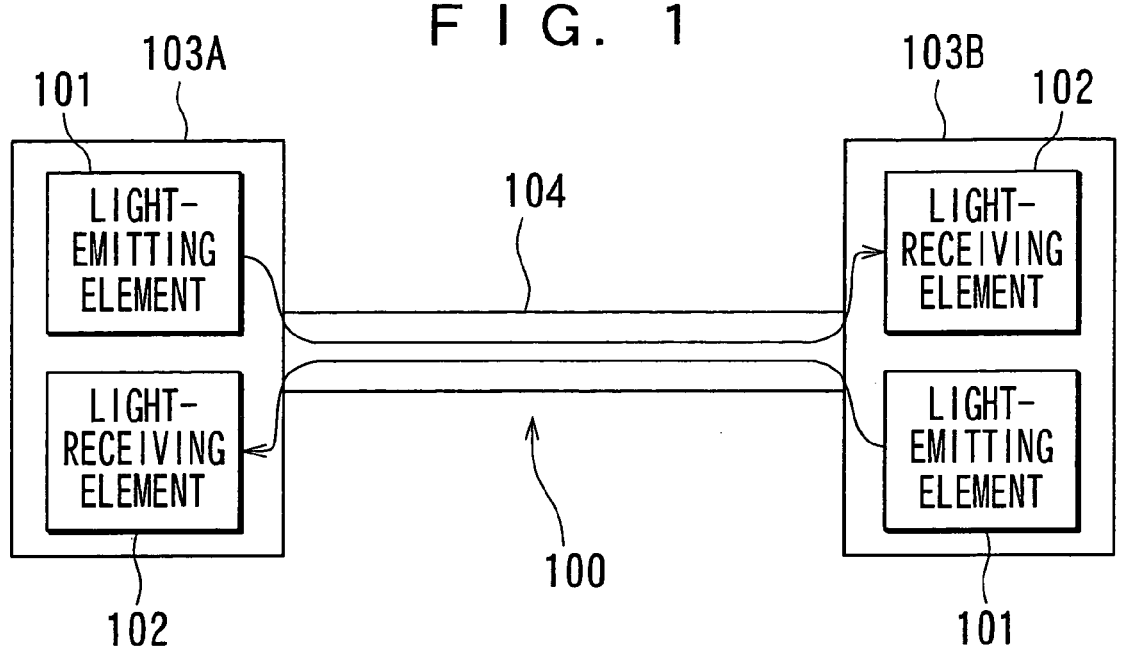
FIG. 1 is an explanatory diagram of an outlined configuration of an optical communication system for performing single-core bi-directional optical fiber communication.
Figure 2:
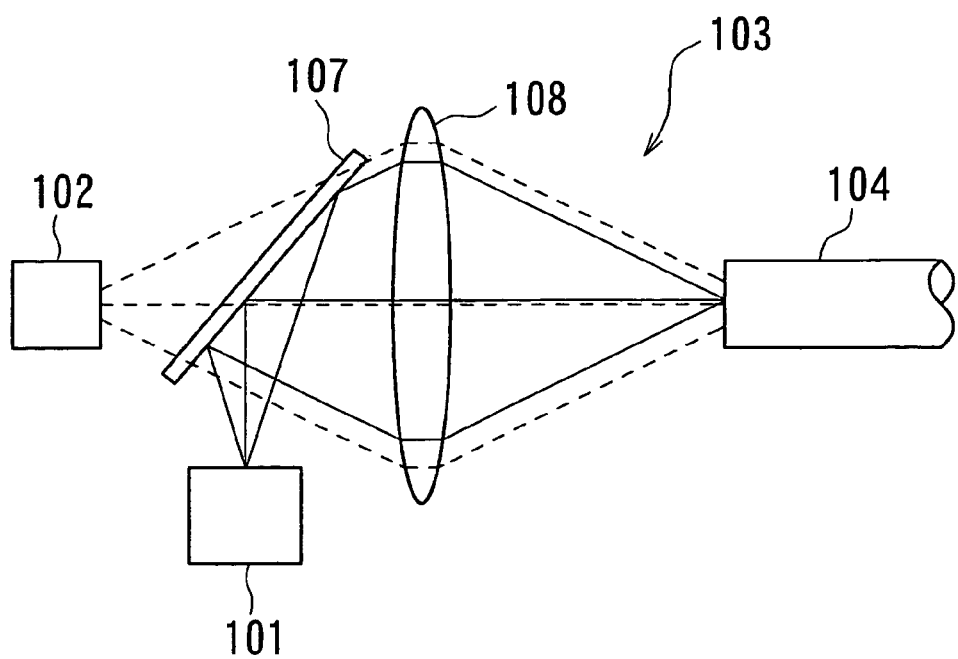
FIG. 2 is a plan view for showing an outlined configuration of a conventional optical transmitter-receiver.
Figure 3:
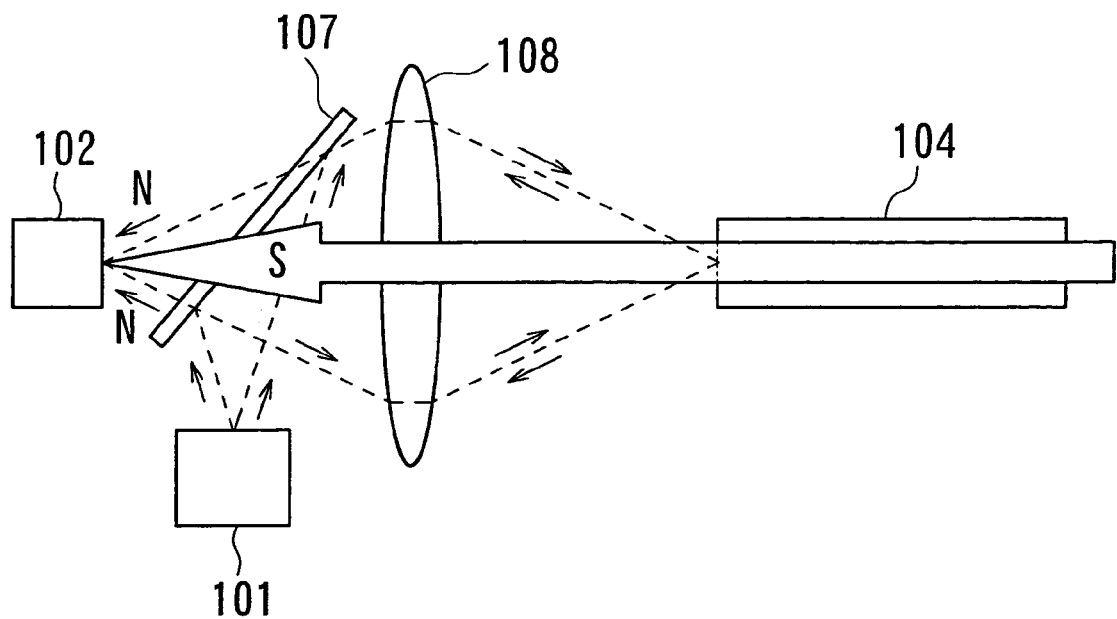
FIG. 3 is an explanatory diagram of principles of crosstalk occurring.

FIGS. 8A and 8B are explanatory diagrams of a first configuration of splicing the optical plate and the optical fiber to each other. As shown in FIG. 8A, the fiber-contacting face 4a of the optical plate 4 and the end face of the optical fiber 3 are respectively constituted of the planar faces, which are parallel to each other. Then, as shown in FIG. 8B, it is configured that the end face of the optical fiber 3 can be pressed to the fiber-contacting face 4a and fixed to it. It is to be noted that, as shown in FIGS. 6A and 6B, the optical fiber 3 is detachable from the optical transmitter-receiver 1a or fixed to it un-detachably. If the optical fiber 3 is detachable, an end face of the ferrule 9a shown in FIG. 3 is constituted of a planar face.

Accordingly, the fiber-contacting face 4a of the optical plate 4 and the end face of the optical fiber 3 come in contact with each other closely. By making the optical plate 4 of a material having a refraction index nearly equal to that of the optical fiber 3, the reflection coefficient at the boundary face between the fiber-contacting face 4a of the optical plate 4 and the end face of the optical fiber 3 is reduced, thereby decreasing crosstalk.

Figure 9A:
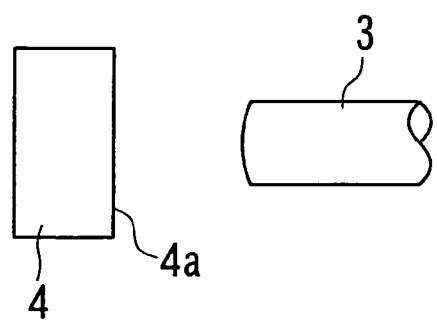
FIGS. 9A and 9B are explanatory diagrams each for showing a second configuration of splicing the optical plate and the optical fiber to each other.
Figure 9B:
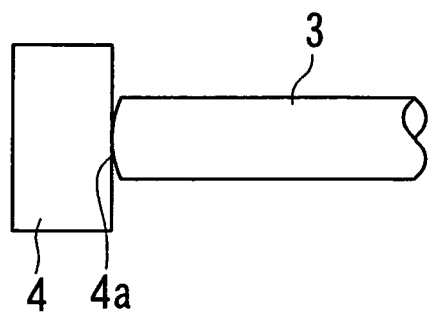

FIGS. 9A and 9B are explanatory diagrams of a second configuration of splicing the optical plate and the optical fiber to each other. As shown in FIG. 9A, the fiber-contacting face 4a of the optical plate 4 is constituted of a planar face and the end face of the optical fiber 3 is constituted of a convex spherical face. Then, as shown in FIG. 9B, the end face of the optical fiber 3 is pressed to the fiber-contacting face 4a and fixed to it. It is to be noted that, as shown in FIGS. 6A and 6B, the optical fiber 3 is detachable from the optical-transmitter-receiver 1a or fixed to it un-detachably in configuration. If the optical fiber 3 is detachable, the end face of the ferrule 9a shown in FIGS. 6A and 6B is constituted of a convex spherical face so that the end face of the optical fiber 3 may be positioned at a vertex of the spherical face in configuration.

Accordingly, the vertex of the end face, which is spherical, of the optical fiber 3 comes in contact with the fiber-contacting face 4a, which is planar, of the optical plate 4. This causes the fiber-contacting face 4a and the end face of the optical fiber 3 to come in contact with each other closely. Therefore, by making the optical plate 4 of a material having a refraction index nearly equal to that of the optical fiber 3, the reflection coefficient at the boundary face between the fiber-contacting face 4a of the optical plate 4 and the end face of the optical fiber 3 is reduced, thereby decreasing crosstalk.

Figure 10A:
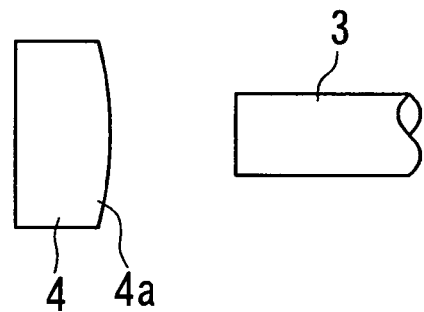
FIGS. 10A and 10B are explanatory diagrams each for showing a third configuration of splicing the optical plate and the optical fiber to each other.
Figure 10B:
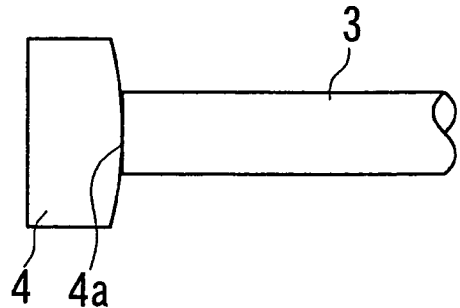

FIGS. 10A and 10B are explanatory diagrams of a third configuration of splicing the optical plate and the optical fiber to each other. As shown in FIG. 10A, the fiber-contacting face 4a of the optical plate 4 is constituted of a convex spherical face and the end face of the optical fiber 3 is constituted of a planar face. Then, as shown in FIG. 10B, the end face of the optical fiber 3 is pressed to the fiber-contacting face 4a and fixed to it. It is to be noted that, as shown in FIGS. 6A and 6B, the optical fiber 3 is detachable from the optical transmitter-receiver 1a or fixed to it un-detachably in configuration.

Accordingly, the end face, which is planar, of the optical fiber 3 comes in contact with the fiber-contacting face 4a, which is spherical, of the optical plate 4, thereby causing the fiber-contacting face 4a and the end face of the optical fiber 3 to come in contact with each other closely. Therefore, by making the optical plate 4 of a material having a refraction index nearly equal to that of the optical fiber 3, the reflection coefficient at the boundary face between the fiber-contacting face 4a of the optical plate 4 and the end face of the optical fiber 3 is reduced, thereby decreasing crosstalk.

Figure 11:
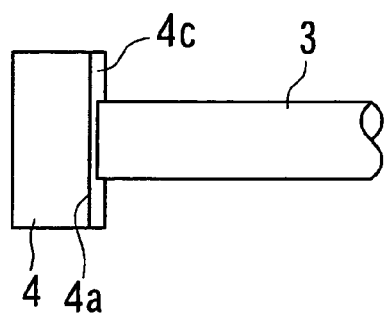
FIG. 11 is explanatory diagram for showing a fourth configuration of splicing the optical plate and the optical fiber to each other.

FIG. 11 is an explanatory diagram of a fourth configuration of splicing the optical plate and the optical fiber to each other. In the example shown in FIG. 11, the fiber-contacting face 4a of the optical plate 4 and the end face of the optical fiber 3 are each constituted of a planar face. Between this fiber-contacting face 4a and the end face of the optical fiber 3, a matching agent 4c is provided which is made of resin having a refraction index equivalent to those of the optical plate 4 and the optical fiber 3. It is to be noted that, in the example show in FIG. 11, the optical fiber 3 is fixed to the optical transmitter-receiver 1 un-detachably in configuration.

The matching agent 4c is one example of slicing member. For example, resin that composes the matching agent 4c is poured between the fiber-contacting face 4a and the end face of the optical fiber 3 and the optical fiber 3 is pressed to the fiber-contacting face 4a and fixed to it. Accordingly, the fiber-contacting face 4a of the optical plate 4 and the end face of the optical fiber 3 are each adhered to the matching agent 4c. By making the matching agent 4c and the optical plate 4 of a material having a refraction index nearly equal to that of the optical fiber 3, the reflection coefficient at each of the boundary faces between the fiber-contacting face 4a of the optical plate 4 and the matching agent 4c and between the matching agent 4c and the end face of the optical fiber 3 is reduced, thereby decreasing crosstalk.

Figure 12:
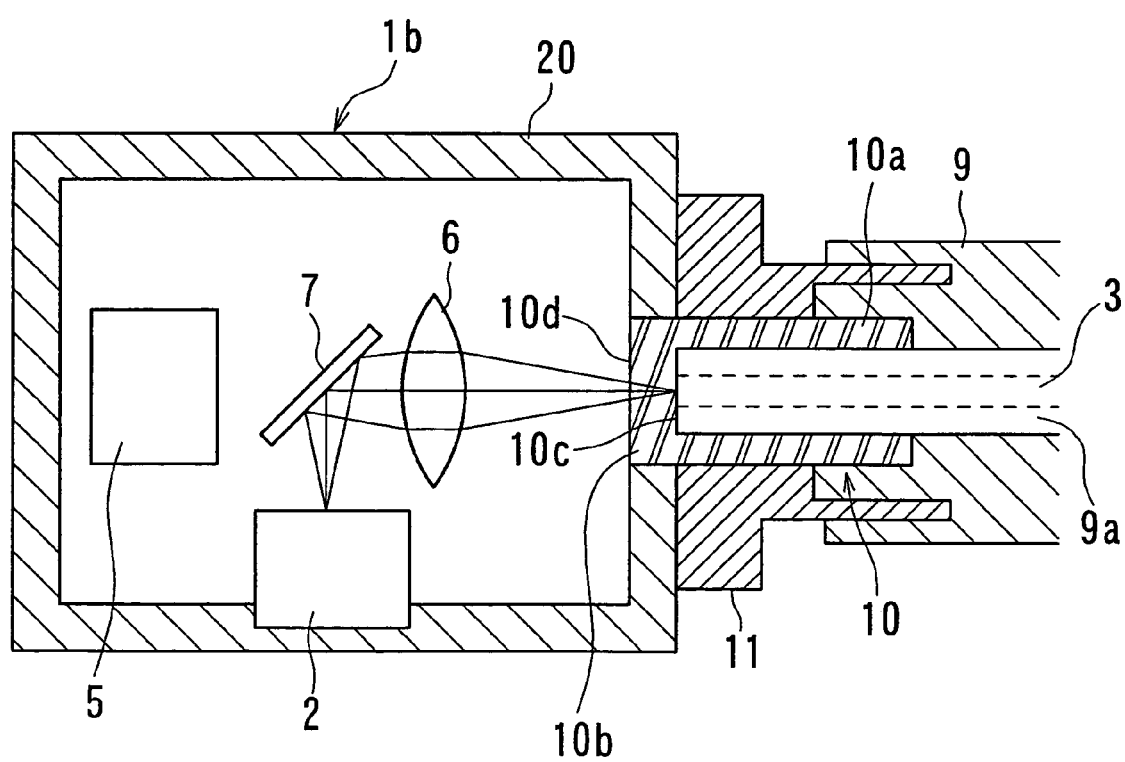
FIG. 12 is a plan view for showing an outlined configuration of a second embodiment of an optical transmitter-receiver according to the invention.

The following will describe a second embodiment of an optical transmitter-receiver. FIG. 12 is a plan view for showing an outlined configuration of the second embodiment of the optical transmitter-receiver according to the invention. An optical transmitter-receiver 1b shown in FIG. 12 comprises an optical plate-integrated sleeve 10. The optical plate-integrated sleeve 10 is provided to a connector 11 to which a plug 9 of an optical fiber 3 is connected. The optical plate-integrated sleeve 10 is constituted by integrating with each other a sleeve portion 10a serving as one example of guide member into which a ferrule 9a of a plug 9 is inserted and an optical plate portion 10b.

The optical plate-integrated sleeve 10 is made of a material having a refraction index nearly equal to that of the optical fiber 3. The optical portion 10b has its fiber-contacting face 10c formed inside the sleeve portion 10a and a face 10d opposite to this fiber-contacting face 10c.

It is configured that when the plug 9 is connected to the connector 11, the ferrule 9a is inserted into the sleeve portion 10a so that an optical axis of the optical fiber 3 and that of a lens 6 may agree. Further, when the plug 9 is connected to the connector 11, an end face of the fiber 3 supported by the sleeve portion 10a is guided to but against the fiber-contacting face 10c of the optical plate portion 10b so that they may come in contact with each other closely.

It is configured that when the plug 9 is connected to the connector 11, light emitted from the light-emitting element 2, which is indicated by a solid line in FIG. 12, is focused through the lens 6 to the end face of the optical fiber 3. Therefore, since the face 10d of the optical plate-integrated sleeve 10 is present on the upstream side of the end face of the optical fiber 3, a part of light, which is reflected by the face 10d, becomes light returned to the light-receiving element 5. This, however, prevents the light thus returned form focusing on the light-receiving element 5, so that crosstalk can be reduced. Further, a reflection coefficient at a boundary face between the fiber-contacting face 10c of the optical plate portion 10b and the end face of the optical fiber 3 decreases, thereby decreasing the crosstalk.

In the optical transmitter-receiver 1b shown in FIG. 12, the optical plate and the sleeve are integrated into a one-piece component, thereby enabling the number of the components to be decreased. Further, it is possible to easily achieve assembly accuracy, which is necessary to closely bring the end face of the optical fiber 3 into contact with the fiber-contacting face of the optical plate. It is to be noted that in a configuration shown in FIG. 12, the end face of the optical fiber 3 may be constituted of a spherical face.

Figure 13A:
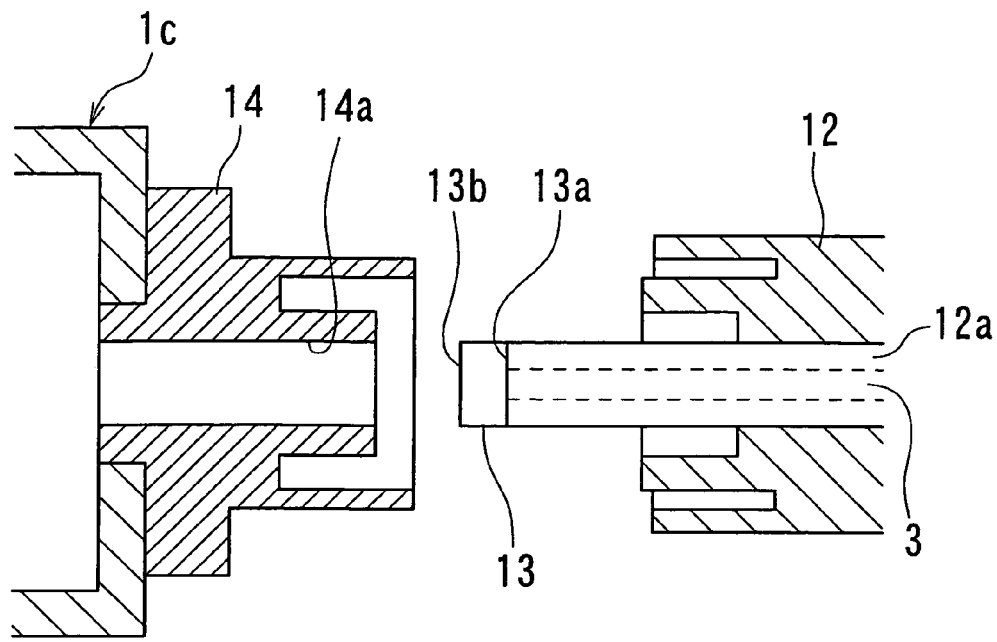
FIGS. 13A and 13B are plan views each for showing a configuration of an optical fiber.
Figure 13B:
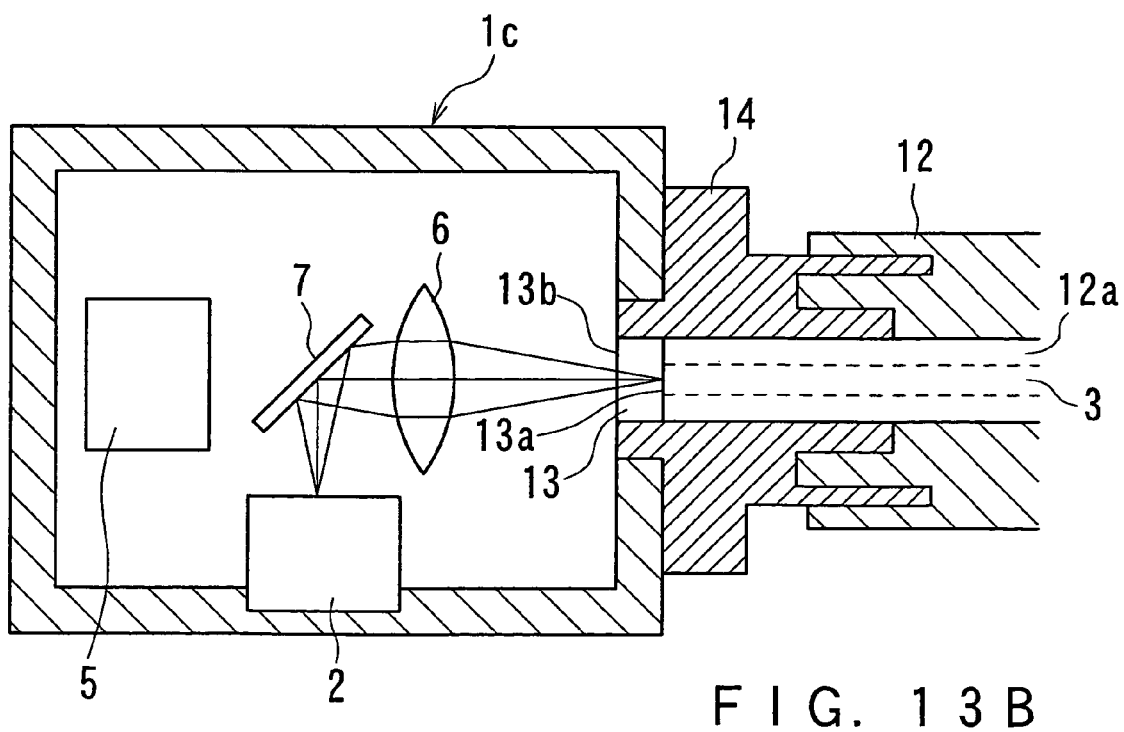

Although the optical plate has been provided on a side of the optical transmitter-receiver in the above-mentioned first and second embodiments in configuration, the optical plate may be provided on a side of the optical fiber. The following will describe a configuration of an optical fiber having an optical plate and an optical transmitter-receiver to which this optical fiber is connected. FIGS. 13A and 13B are plan views each for showing a configuration of the optical fiber. FIG. 13A shows a condition where it is disconnected from the optical transmitter-receiver and FIG. 13B shows a condition where it is connected to the optical transmitter-receiver.

The optical fiber 3 is provided with a plug 12. The plug 12 is one example of attachment. A ferrule 12a of the plug 12 supports the optical fiber 3. The ferrule 12a is provided with an optical plate 13 at a tip thereof. This optical plate 13 is one example of reflector. It is provided with a fiber-contacting face 13a and a face 13b opposite to the fiber-contacting face 13a. The optical plate 13 is mounted so that the fiber-contacting face 13a can be closely brought in contact with the end face of the optical fiber 3.

An optical transmitter-receiver 1c is equipped with a connector 14 to which the plug 12 is connected. The connector 14 is provided with a sleeve 14a into which the ferrule 12a of the plug 12 is inserted. This sleeve 14a is so arranged as to support the optical plate 13 at the tip of the ferrule 12a. It is configured that when the plug 12 is connected to the connector 14, light emitted from the light-emitting element 2, which is indicated by a solid line in FIG. 13B, may be focused through the lens 6 on the end face of the optical fiber 3.

In this configuration, a part of the light emitted from the light-emitting element 2 and made incident upon the optical fiber 3 through the lens 6 is reflected by the face 13b of the optical plate 13, to provide light returned to the light-receiving element 5.

As described above, it is configured that the light emitted from the light-emitting element 2 may be focused through the lens 6 on the end face of the optical fiber 3. This prevents the light thus returned, which is reflected by the face 13b positioned closer to the lens 6 than the end face of the optical fiber 3 by a predetermined distance, from focusing at a position of the light-receiving element 6 even after passing through the lens 6. Accordingly, crosstalk can be reduced. Further, by making the optical plate 13 of a material having a refraction index nearly equal to that of the optical fiber 3, a reflection coefficient at a boundary between the fiber-contacting face 13a of the optical plate 13 and the end face of the optical fiber 3 is decreases, thus decreasing crosstalk again.

Figure 14:
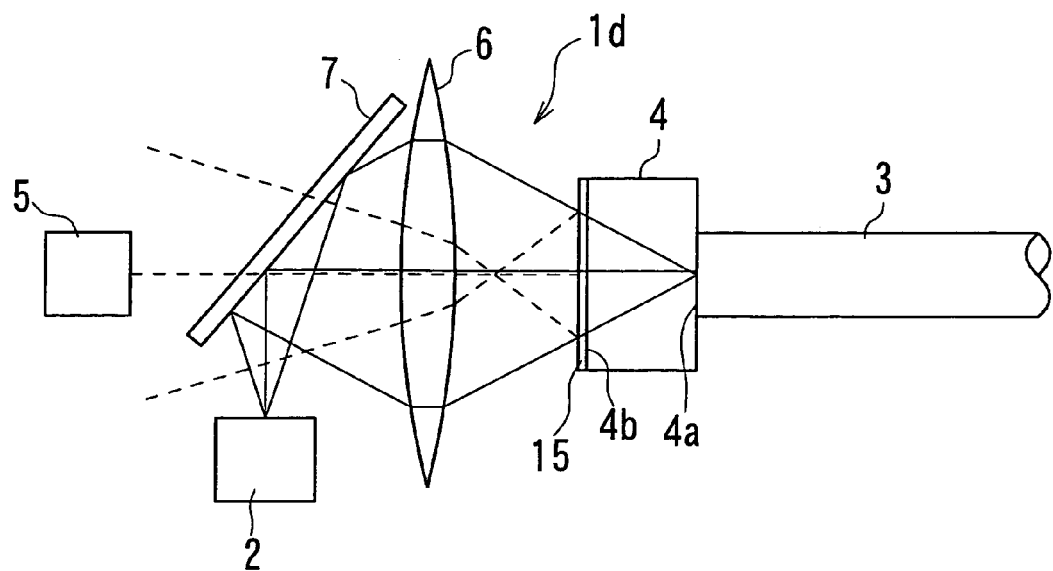
FIG. 14 is a plan view for showing an outlined configuration of a third embodiment of an optical transmitter-receiver according to the invention.

The following will describe a configuration of an optical transmitter-receiver that has reduced crosstalk by treating an optical plate. FIG. 14 is a plan view for showing an outlined configuration of a third embodiment of an optical transmitter-receiver according to the invention. The third embodiment of the optical transmitter-receiver 1d has a reflection preventing coating 15 that is applied to a face 4b opposite to a fiber-contacting face 4a of an optical plate 4. The reflection preventing coating 15 reduces crosstalk due to light reflected by the face 4b. In FIG. 14, light emitted from a light-emitting element 2 is indicated by a solid line and light returned toward a light-receiving element 5 by reflection of the face 4b, by a broken line. It is to be noted that this optical transmitter-receiver 1d has the same configuration as that described with reference to FIG. 4 except the reflection preventing coating 15.

Below, light $N_P$ thus returned at the face 4b is given by following Equation (8) in a case where an AR coating (Anti-Reflection coating) is applied to the face 4b as the reflection preventing coating 15.

$$N_P = 0.5 \times 0.5 deP_1 = 6.3 \times 10^{-5} P_1 \quad (8)$$

Wherein $P_1$ indicates intensity of light emitted from the light-emitting element 2; "d" indicates reflection coefficient of the face 4b of the optical plate 4; and "e" indicates coupling efficiency between the light returned at the face 4b of the optical plate 4 and the light-receiving element 5.

By applying an AR coating on the face 4b of the optical plate 4, a reflecting coefficient d is greatly decreased to a value of d=0.005 as compared with the case of Equation (3).

It is to be noted that a coupling efficiency e takes on a value of e=0.05 as in the case where a diameter of light received at the light-receiving element 5 is 120 μm again, supposing that a spot diameter of the returned light is 700 μm.

Using, as signal light S, a value obtained by Equation (5), S/N ratio is given by following Equation (9).

$$S/N = S/(N_P + N_f) = 1617 P_2/P_1 \quad (9)$$

As described above, when the relationship of S/N>10 is necessary, a tolerable loss is given by the following equation (10).

$$P_1/P_2 > 6.2 \times 10^3 \quad (10)$$

According to Equation (10), a loss of −22 dB is tolerated. Accordingly, it is appreciated that as compared with a tolerable loss obtained by Equation (7) in the first embodiment of the optical transmitter-receiver 1a that is provided with no reflection preventing coating 15, a tolerable loss through the optical fiber 3 according to this embodiment has a further margin of 3 dB.

Figure 15:
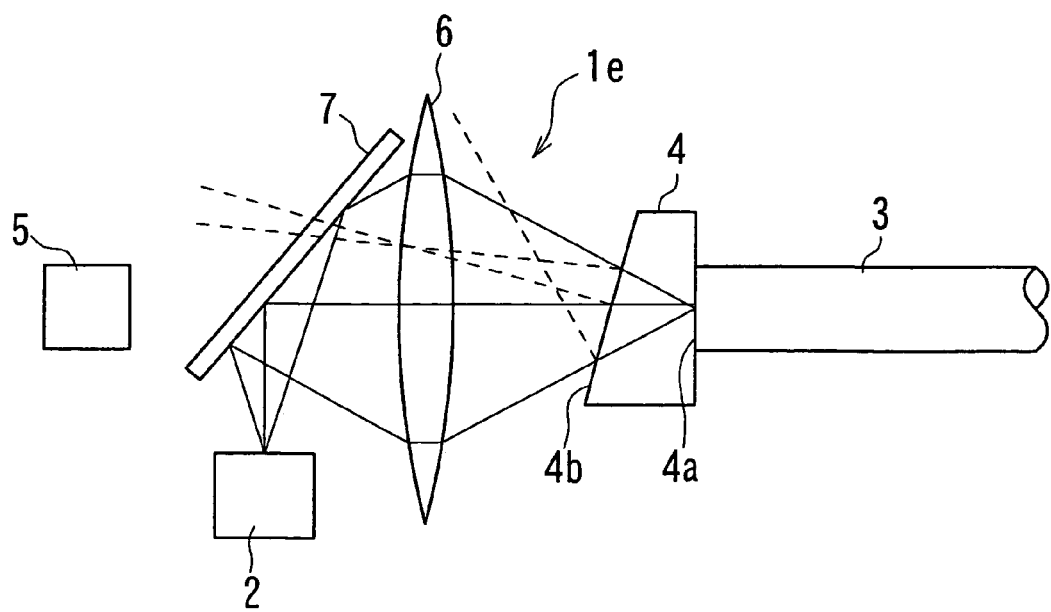
FIG. 15 is a plan view for showing an outlined configuration of a fourth embodiment of an optical transmitter-receiver according to the invention.

FIG. 15 is a plan view for showing an outlined configuration of a fourth embodiment of an optical transmitter-receiver according to the invention. In the fourth embodiment of the optical transmitter-receiver 1e, a face 4b opposite to a fiber-contacting face 4a of an optical plate 4 is inclined with respect to a plane perpendicular to an optical axis. In FIG. 15, light emitted from a light-emitting element 2 is indicated by a solid line and light returned toward a light-receiving element 5 by reflection of the face 4b, by a broken line. It is to be noted that this optical transmitter-receiver 1e has the same configuration as that described with reference to FIG. 4 except the inclined face 4b.

A value of an S/N ratio in the case where the face 4b is inclined is given by following Equation (11).

$$S/N = S/(N_P + N_f) = 2042 P_2/P_1 \quad (11)$$

wherein $N_P$ indicates light returned by the face 4b; and Nr indicates light returned by the end face of the optical fiber 3.

A value of signal light S is given by Equation (5). It is to be noted that d=0 because the face 4b of the optical plate 4 is inclined and, therefore, the light returned by reflection of the face 4b is not coupled to the light-receiving element 5. Accordingly, the light $N_P=0$ as reflected by the face 4b.

As described above, when the relationship of S/N>10 is necessary, a tolerable loss is given by the following equation (12).

$$P_1/P_2 > 5.0 \times 10^{-3} \quad (12)$$

According to Equation (12), a loss of −23 dB is tolerated. Accordingly, it is appreciated that as compared with a tolerable loss obtained by Equation (7) in the optical transmitter-receiver 1a in which the face 4b is not inclined, a tolerable loss through the optical fiber 3 according to this embodiment has a further margin of 4 dB.

Figure 16:
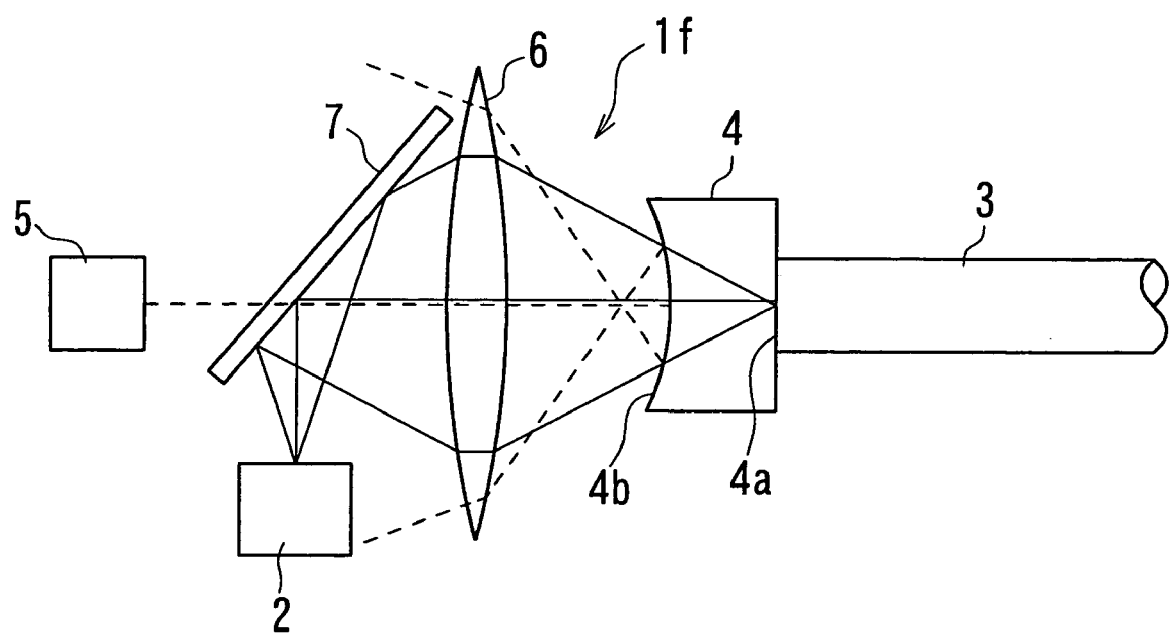
FIG. 16 is a plan view for showing an outlined configuration of a fifth embodiment of an optical transmitter-receiver according to the invention.

FIG. 16 is a plan view for showing an outlined configuration of a fifth embodiment of an optical transmitter-receiver according to the invention. In the fifth embodiment of the optical transmitter-receiver 1f, a face 4b opposite to a fiber-contacting face 4a of an optical plate 4 is constituted of a concave-spherical face. In FIG. 16, light emitted from a light-emitting element 2 is indicated by a solid line and light returned by reflection of the face 4b, by a broken line. It is to be noted that this optical transmitter-receiver 1f has the same configuration as that described with reference to FIG. 4 except that the concave-spherical face 4b.

Below, light $N_P$ returned by the reflection of the face 4b is given by following Equation (13) in the case where the opposite fiber-contacting face 4b is concave-spherical.

$$N_P = 0.5 \times 0.5 de P_1 = 3.0 \times 10^{-4} P_1 \quad (13)$$

wherein:

$P_1$: Intensity of light emitted from the light-emitting element 2;

d: reflection coefficient of the face 4b of the optical plate 4; and e: coupling efficiency between the light returned at the face 4b of the optical plate 4 and the light-receiving element 5.

In this embodiment, d=0.03 is given if the optical plate 4 is made of quartz glass having a refraction index of about 1.45. Further, since the face 4b is concave-spherical, a spot diameter of returned light takes on a large value of 3 mm and e=0.04 is given if a diameter of light received at the light-receiving element 5 is 120 μm.

Using, as signal light S, a value obtained by Equation (5), the S/N ratio is given by following Equation (14).

$$S/N = S/(N_P+N_f) = 907 P_2/P_1 \quad (14)$$

As described above, when the relationship of S/N>10 is necessary, a tolerable loss is given by the following equation (15).

$$P_1/P_2 > 0.011 \quad (15)$$

According to Equation (15), a loss of −20 dB is tolerated. Accordingly, it is appreciated that as compared with a tolerable loss obtained by Equation (7) in the first embodiment of the optical transmitter-receiver 1a in which the face 4b is not spherical, a tolerable loss through the optical fiber 3 according to this embodiment has a further margin of 1 dB.

As described above, by providing the optical plate 4 to the end face of the optical fiber 3, a high S/N ratio value can be achieved in an optical transmitter-receiver involved in single-core bi-directional full-duplex optical fiber communication. As appreciated from a comparison between Equation (2) for the conventional example and Equation (12) for the fourth embodiment wherein the optical plate 4 has the inclined face 4b, the tolerable loss through the optical fiber 3 has a margin of 13 dB.

That is, assuming the case of laying down a fiber made of a fluorine-based plastic fiber having a flexure loss of 0.2 dB/90° and a tolerable curvature radius R=20 mm, the fiber can be flexed 65 times more if it is the optical fiber 3. Further, in a case of length of the optical fiber 3, the fiber can be laid down by as long as 325 m more if it has a transmission loss of −4 dB/100 m.

It greatly relaxes restrictions on laying down of the optical fiber cables owing to flexure and length of the optical fiber 3.

Thus has been described an optical transmitter-receiver used for the single-core bi-directional full-duplex optical fiber communication. This invention, however is not limited to this. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An optical transmitter-receiver connected to a single-core optical fiber, comprising:

light emitter for emitting first light;

light receiver for receiving second light launched from the optical fiber;

focusing device for focusing the first light to the optical fiber and the second light to the light receiver;

optical-path splitter for splitting the first light emitted from the light emitter to guide the first light to the optical fiber and to guide the second light launched from the optical fiber to the light receiver; and reflector for reflecting a part of the first light, said part returning to the light receiver, said reflector having a fiber-contacting face for allowing the reflector to come in contact with an end face of the optical fiber and a face for reflecting the part of the first light, said face being opposite to the fiber-contacting face.

2. The transmitter-receiver according to claim 1, further comprising an attachment for attaching the optical fiber detachably, wherein the attachment supports the optical fiber with the end face of the optical fiber being brought in contact with the fiber-contacting face of the reflector.

3. The transmitter-receiver according to claim 1, wherein the reflector is made of a material having a refraction index nearly equal to that of the optical fiber.

4. The transmitter-receiver according to claim 3, wherein the reflector is made of quartz glass and the optical fiber is made of fluorine-based plastic fiber.

5. The transmitter-receiver according to claim 1, wherein the fiber-contacting face of the reflector and the end face of the optical fiber are each constituted of a planar face.

6. The transmitter-receiver according to claim 1, wherein the fiber-contacting face of the reflector is constituted of a planar face and the end face of the optical fiber is constituted of a convex spherical face.

7. The transmitter-receiver according to claim 1, wherein the fiber-contacting face of the return-light reflecting means is constituted of a convex spherical face and the end face of the optical fiber is constituted of a planar face.

8. The transmitter-receiver according to claim 1, wherein between the fiber-contacting face of the reflector and the end face of the optical fiber, splicing member made of resin is inserted, said splicing member closely coming in contact with the fiber-contacting face and the end face of the optical fiber and having a refraction index equivalent to those of the reflector and the optical fiber.

9. The transmitter-receiver according to claim 2,
wherein the attachment is provided with a guide member for guiding and supporting the optical fiber; and
wherein the guide member and the reflector are integrated with each other, with the end face of the optical fiber supported by the guide member being brought in contact with the fiber-contacting face of the reflector.

10. The transmitter-receiver according to claim 1, wherein a reflection preventing coating is applied on the face for reflecting the part of the first light in the reflector.

11. The transmitter-receiver according to claim 1, wherein the face for reflecting the part of the first light in the reflector is inclined with respect to a plane perpendicular to an optical axis.

12. The transmitter-receiver according to claim 1, wherein the face for reflecting the part of the first light in the reflector is formed concave-spherical.

13. An optical fiber connected to an optical transmitter-receiver for performing transmission and reception of an optical signal, comprising:
a main optical fiber for performing transmission and reception of light; and
a reflector for reflecting a part of light from the optical transmitter-receiver, said reflector having a fiber-contacting face for allowing the reflector to come in contact with the main optical fiber and a face for reflecting said part of the light, said face being opposite to the fiber-contacting face,
wherein the reflector is attached to an end face of the main optical fiber with the fiber-contacting face thereof being brought in contact with the end face of the main optical fiber, said light from the optical transmitter-receiver focusing on the end face.

14. The optical fiber according to claim 13 further comprising an attachment for attaching the optical fiber detachably to the optical transmitter-receiver, wherein the reflector is provided to the attachment.

* * * * *